(12) United States Patent
Jian

(10) Patent No.: US 12,434,617 B2
(45) Date of Patent: Oct. 7, 2025

(54) PICKUP TRUCK FASTENING ANCHOR

(71) Applicant: Yanwei Jian, Guangzhou (CN)

(72) Inventor: Yanwei Jian, Guangzhou (CN)

( * ) Notice: Subject to any disclaimer, the term of this patent is extended or adjusted under 35 U.S.C. 154(b) by 483 days.

(21) Appl. No.: 17/973,509

(22) Filed: Oct. 25, 2022

(65) Prior Publication Data

US 2024/0131978 A1 Apr. 25, 2024
US 2024/0227658 A9 Jul. 11, 2024

(51) Int. Cl.
*B60P 7/00* (2006.01)
*B60P 7/08* (2006.01)

(52) U.S. Cl.
CPC .................................. *B60P 7/0807* (2013.01)

(58) Field of Classification Search
CPC .. B60P 7/10; B60P 7/0815; B60P 7/08; B60P 7/0807
See application file for complete search history.

(56) References Cited

U.S. PATENT DOCUMENTS

| | | | | |
|---|---|---|---|---|
| 6,764,259 B1* | 7/2004 | Preta | ................... | B60P 7/0807 |
| | | | | 410/106 |
| 9,511,705 B1* | 12/2016 | Egigian | ................ | B60P 7/0807 |
| 11,135,963 B1* | 10/2021 | Goebel | ................ | B60P 7/0807 |
| 2020/0238889 A1* | 7/2020 | Jansma | ................ | B60P 3/007 |
| 2020/0353856 A1* | 11/2020 | Egigian | ................ | B60P 7/0807 |

* cited by examiner

*Primary Examiner* — Steven O Douglas

(57) ABSTRACT

A pickup truck fastening anchor. The pickup truck fastening anchor comprises a fixing portion and a stretching portion, wherein the fixing portion comprises an iron bracket and an aluminum block; the stretching portion comprises an aluminum U-ring and an aluminum cover; the iron bracket is fitted on a top surface of the aluminum block; the aluminum cover is located above the iron bracket; the aluminum cover is fixed on the iron bracket by means of a coarse screw; two through holes are provided in each of the iron brackets, the aluminum block and the aluminum cover; the positions of the through holes in the iron bracket, the aluminum block and the aluminum cover are correspondingly arranged; the aluminum U-ring successively penetrates the through holes in the aluminum cover, the iron bracket and the aluminum block; and two ends of the aluminum U-ring are provided with external threads.

3 Claims, 2 Drawing Sheets

PICKUP TRUCK FASTENING ANCHOR

RELATED APPLICATION

This patent application claims the benefit, and incorporates by reference, a PCT application with an international application No. of PCT/CN2021/081456 and a publication number WO/2022/183532.

FIELD OF THE INVENTION

The present utility model relates to a tool for pickup trucks, and in particular to a pickup truck fastening anchor.

BACKGROUND OF THE INVENTION

In daily life, people have to pull goods with trucks from time to time. To prevent the goods from falling and guarantee safety, it is requisite to tie the goods tightly to the carriage with ropes.

However, there is no hook to connect the rope in the carriage, hence the need for the buckle to play a connecting role.

SUMMARY OF THE INVENTION

In view of the technical problem to be solved, the present utility model provides a pickup truck fastening anchor.

To achieve the above purpose, the present utility model presents the following technical solution:

A pickup truck fastening anchor comprising: a fixed part and a stretching part, wherein the fixed part comprises an iron bracket and an aluminum block; the stretching part comprises an aluminum U-ring and an aluminum cover; the iron bracket is attached to the top surface of the aluminum block; the aluminum cover is positioned above the iron bracket; the aluminum cover is fixed on the iron bracket through thick screws; two through holes are opened on the iron bracket, the aluminum block and the aluminum cover respectively, and the through holes of the iron bracket, the aluminum block and the aluminum cover are correspondingly set, allowing the aluminum U-ring to sequentially penetrate through the through holes of the aluminum cover, the iron bracket and the aluminum block; external threads and matching nuts are set at both ends of the aluminum U-ring; the fixed part also comprises two hexagonal screws which are inserted into the aluminum block from the side, and a thick spring is set in the through hole of the aluminum block; the front ends of the hexagonal screws abut against the thick spring, the thick spring is sleeved outside the aluminum U-ring; and the two ends of the thick spring are respectively abutted against the nuts and the iron bracket.

As the preferred scheme of the present utility model, the front end of the hexagonal screw is sleeved with a thin spring, the front end of the thin spring is abutted against a rolling ball, and two rods of the aluminum U-ring are provided with an annular groove.

As a further preferred scheme of the present utility model, a gasket is set between the nut and the thick spring.

In comparison with the prior art, the present utility model has the beneficial effects that when the device is in use, the buckle is clamped in the aperture of the carriage by the iron bracket of the fixed part, and then the device is integrally fixed in the carriage by the aluminum block, so that the device cannot fall off from the carriage; and the aluminum U-ring of the stretching part can bind the rope to the buckle, so as to bind the goods on the carriage. In comparison with the conventional buckle connection, the device is more stable and convenient to install and use.

In the figures: 1. Aluminum U-ring; 2. Thick screw; 3. Aluminum cover; 4. Iron bracket; 5. Aluminum block; 6. Thick spring; 7. Gasket; 8. Nut; 9. Hexagonal screw; 10. Thin spring; 11. Rolling ball.

DESCRIPTION OF THE PREFERRED EMBODIMENTS

The technical solution of the embodiment of the present utility model is described below in a clear and complete manner with reference to the drawings in the embodiments of the present utility model. Evidently, the foregoing description merely shows a part of the embodiments of the present utility model, and the actual embodiments are not limited thereto. Based on the embodiments of the present utility model, all other embodiments acquired by a person having ordinary skill in the art without creative labor is still within the protection scope of the present utility model.

In the description of the present utility model, what needs illustration is that the directions or positional relationships indicated by the terms "center", "upper", "lower", "left", "right", "vertical", "horizontal", "inside" and "outside" are based on the directions or positional relationships demonstrated in the attached drawings, which are set only for the convenience of describing the present utility model and simplifying the description, instead of indicating or implying that the device or its elements must have a specific orientation, be constructed and operated in a specific orientation. Thus, they cannot be comprehended as limitations to the present utility model. Besides, the terms "first", "second" and "third" are only used for descriptive purposes, and cannot be comprehended as indicating or implying relative importance.

In the description of the present utility model, what needs illustration is that unless otherwise specified and confined, the terms "installation", "connection" and "linking" should be comprehended in a broad sense. For example, it can be fixed connection, detachable connection or integrated connection, mechanical connection or electrical connection, direct connection or indirect connection through an intermediate medium, or internal communication between the two elements. For a person having ordinary skill in the art, the concrete meanings of the above terms in the present utility model can be comprehended in concrete circumstances.

Figure 1:
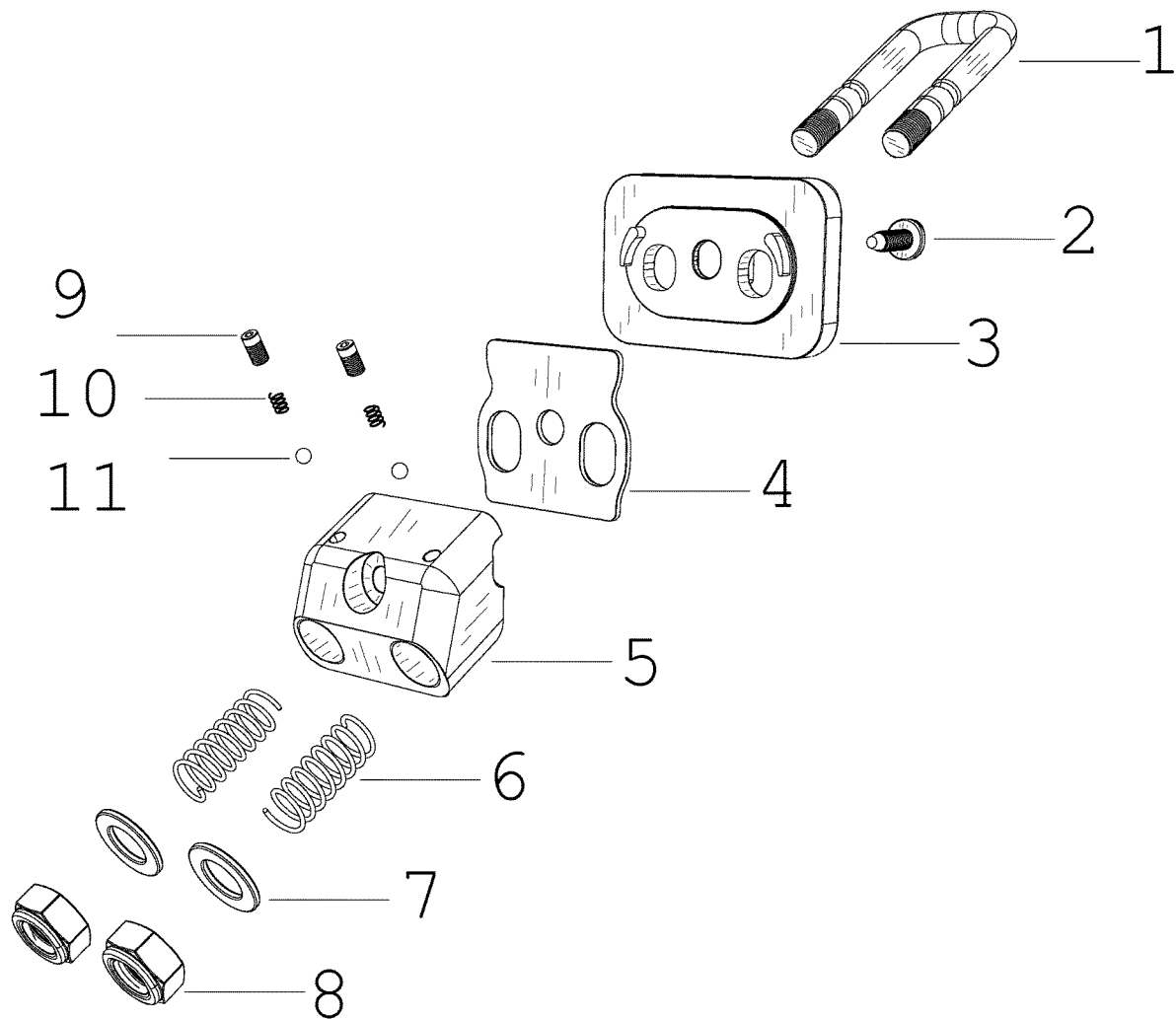
FIG. 1 is the structural schematic diagram of the present utility model.
Figure 2:
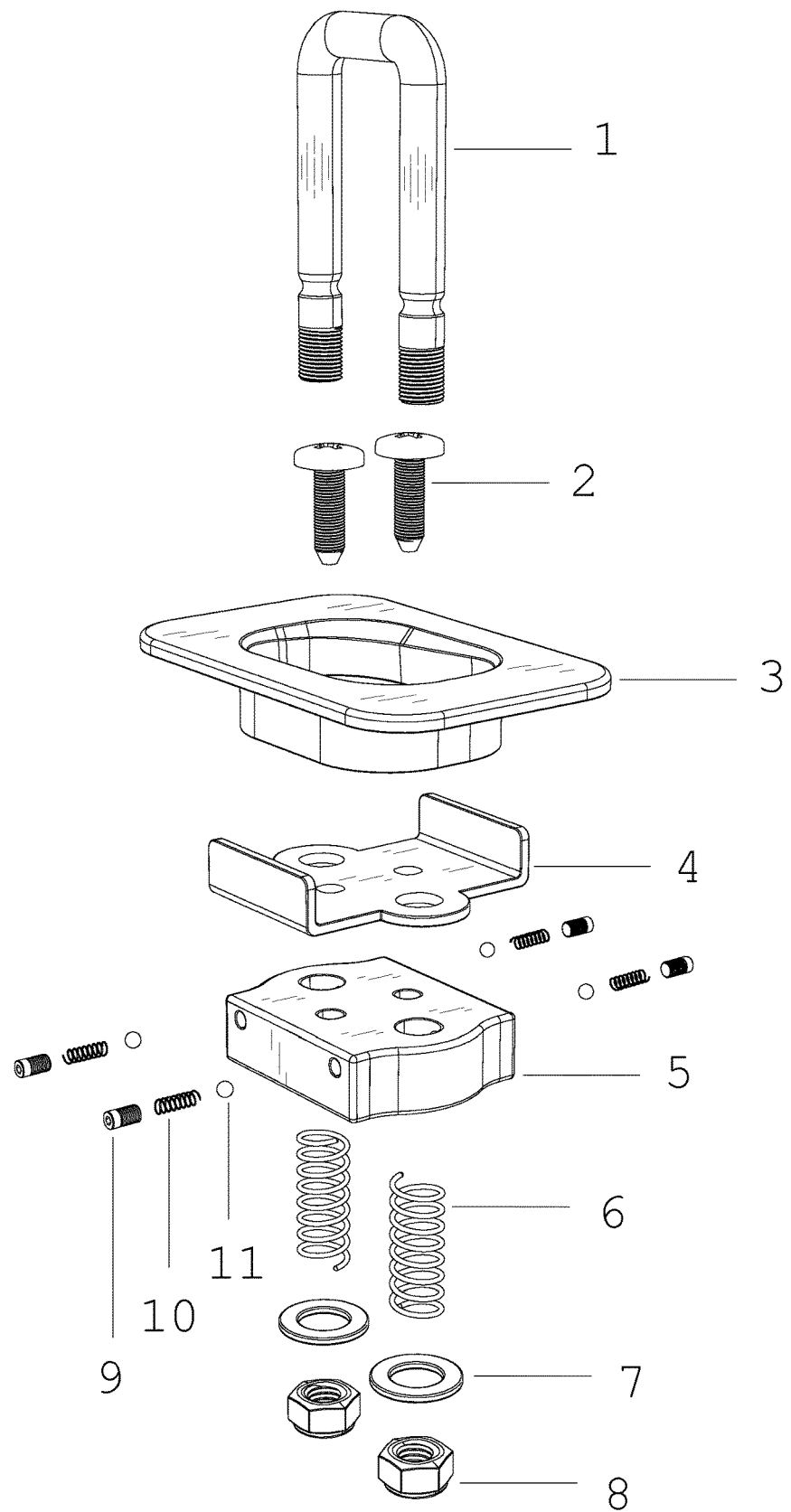
FIG. 2 is the front view of the present utility model.

Please refer to FIG. 1-2. In the embodiments of the present utility model, a PICKUP TRUCK FASTENING ANCHOR comprising: a fixed part and a stretching part, wherein the fixed part comprises an iron bracket 4 and an aluminum block 5 and the stretching part comprises an aluminum U-ring 1 and an aluminum cover 3; the iron bracket 4 is attached to the top surface of the aluminum block 5; the aluminum cover 3 is positioned above the iron bracket 4; the aluminum cover 3 is fixed on the iron bracket 4 with the thick screws 2; two through holes are opened on the iron bracket 4, the aluminum block 5 and the aluminum cover 3 respectively; in addition, the through holes of the iron bracket 4, the aluminum block 5 and the aluminum cover 3 are correspondingly set, allowing the aluminum U-ring 1 to sequentially penetrate through the through holes of the aluminum cover 3, the iron bracket 4 and the aluminum block 5; the two ends of the aluminum U-ring 1 are provided with external threads and the matching nuts 8; the fixed part also comprises two hexagonal screws 9 which are inserted into the aluminum block 5 from the side, and the thick spring 6 is set in the through holes of the aluminum block 5; the front ends of the hexagonal screws 9 abut against the thick spring 6, and the thick spring 6 is sleeved outside the aluminum U-ring 1; the two ends of the thick spring 6 are butted against the nuts 8 and the iron bracket 4 respectively. When the device is in use, the buckle is clamped in the aperture of the carriage by the iron bracket 4 of the fixed part, and then the whole device is fixed in the carriage by the aluminum block 5 to guarantee that the device will not fall off from the vehicle body. The aluminum U-ring 1 of the stretching part can bind the rope to the buckle, thereby binding the goods on the carriage.

With the setting of the thick spring 6, the aluminum U-ring 1 will not fall off easily in the course of use, and the elastic abutment of the thick spring 6 can prevent the aluminum U-ring 1 from shaking and making abnormal noise when the vehicle is running.

Further, the front end of the hexagonal screw 9 is sheathed with a thin spring 10, and the front end of the thin spring 10 is abutted against the rolling ball 11; two rods of the aluminum U-ring 1 are provided with an annular groove. When the aluminum U-ring 1 is stretched to the maximum extent, the rolling ball 11 will be clamped into the groove by the push and extension and passing of the thin spring 10, thereby guaranteeing that the aluminum U-ring 1 is in a fixed working position.

In the meanwhile, a gasket 7 is set between the nut 8 and the thick spring 6; the gasket 7 can not only guarantee the firm installation of the aluminum U-ring 1, but also prevent the thick spring 6 from slipping.

For a person skilled in the art, the present utility model is obviously limited by the foregoing embodiments, and moreover, it can be realized in other concrete forms without departing from the spirit or basic features of the present utility model. Thus, the embodiments shall be considered as both exemplary and non-restrictive at all circumstances, and the scope of the present utility model is limited by the claims rather than the foregoing descriptions. Hence, all changes that fall within the meaning and scope of the equivalent elements of the claims are intended to be included in the present utility model. The marks in any attached drawings of the claims shall constitute no limitation.

Apart from that, it should be understood that although this Description is described with respect to the embodiments, not every embodiment covers only an independent technical solution. Such narration method of the Description is only for the sake of clarity; those skilled in the art should take the Description as a whole, and the technical solution in each embodiment can be appropriately combined to form other embodiments that can be comprehended by those skilled in the art.

The invention claimed is:

1. A pickup truck fastening anchor comprising a fixed part and a stretching part, wherein the fixed part comprises an iron bracket and an aluminum block, and the stretching part comprises an aluminum U-ring and an aluminum cover;
   the iron bracket is attached to the top surface of the aluminum block; the aluminum cover is positioned above the iron bracket; the aluminum cover is fixed on the iron bracket with a screw;
   the iron bracket, the aluminum block, and the aluminum cover each have two through holes, with the through holes of the iron bracket, the aluminum block, and the aluminum cover aligned to allow the aluminum U-ring to sequentially penetrate through the through holes of the aluminum cover, the iron bracket, and the aluminum block;
   external threads and matching nuts are provided at both ends of the aluminum U-ring;
   the fixed part further includes two hexagonal screws inserted into the aluminum block from a lateral side thereof;
   a first spring is disposed in the through hole of the aluminum block;
   front ends of the hexagonal screws abut against the first spring, and the first spring is sleeved outside the aluminum U-ring;
   both ends of the first spring abut against the nut and the iron bracket, respectively.

2. A pickup truck fastening anchor according to claim 1, wherein the front ends of the hexagonal screws are sheathed with a second spring, the front ends of the second spring abut against the rolling balls, and the two rods of the aluminum U-ring are provided with annular grooves.

3. A pickup truck fastening anchor according to claim 1, wherein a gasket is disposed between the nut and the second spring.

* * * * *